United States Patent
Kokudo

[11] Patent Number: 5,970,061
[45] Date of Patent: Oct. 19, 1999

[54] TRANSMISSION SPACE DIVERSITY CONTROLLING METHOD AND TRANSMISSION SPACE DIVERSITY APPARATUS

[75] Inventor: Junichi Kokudo, Tokyo, Japan

[73] Assignee: NEC Corporation, Japan

[21] Appl. No.: 08/806,279

[22] Filed: Feb. 25, 1997

[30] Foreign Application Priority Data

Mar. 7, 1996 [JP] Japan .................................... 8-049787

[51] Int. Cl.[6] .......................... H04L 12/50; H04Q 11/00; H04B 7/02; H03C 7/02
[52] U.S. Cl. .......................... 370/344; 375/267; 375/358; 455/101; 455/67.1; 455/135
[58] Field of Search ..................... 375/267, 299, 375/347, 358; 370/277, 278, 280, 294, 321, 337, 344, 347, 345; 455/67.1, 67.3, 67.4, 69, 101, 103, 132, 133, 134, 135

[56] References Cited

U.S. PATENT DOCUMENTS

| 5,097,484 | 3/1992 | Akaiwa ..................................... 455/133 |
| 5,507,035 | 4/1996 | Bantz et al. ............................. 455/133 |
| 5,628,052 | 5/1997 | DeStantis et al. ....................... 370/334 |

FOREIGN PATENT DOCUMENTS

| 2-104030 | 4/1990 | Japan . |
| 5-29992 | 2/1993 | Japan . |

*Primary Examiner*—Chi H. Pham
*Assistant Examiner*—Steven Nguyen
*Attorney, Agent, or Firm*—Ostrolenk, Faber, Gerb & Soffen, LLP

[57] ABSTRACT

A transmission space diversity method which is effective also for a communication system wherein different carrier frequencies are used for transmission and reception is disclosed. Such reception space diversity control that a controlling signal from terminal station 10 is received by two antennas 1 and 2 and receivers 3 and 4 of a base station and the two received controlling signals are compared with each other by reception space diversity controlling signal generation circuit 6 and then that signal which exhibits a higher reception level is provided to switch circuit 8. Furthermore, the reception space diversity controlling signal is utilized for transmission space diversity control of antenna selection wherein the output of transmitter 5 is emitted by one of the antennas. A terminal station transmits, when the reception level thereof drops, a signal for requesting reversal of the switching direction of the antennas to the base station, then the base station reverses the transmission space diversity controlling signal in response to the request signal from the terminal station.

7 Claims, 4 Drawing Sheets

* REVERSE-LINK CONTROLLING SIGNAL TIME SLOT INCLUDING TRANSMISSION QUALITY INFORMATION

UW: UNIQUE WORD PATTERN
No.1~No.n: NUMBERS OF TERMINAL STATION

5,970,061

TRANSMISSION SPACE DIVERSITY CONTROLLING METHOD AND TRANSMISSION SPACE DIVERSITY APPARATUS

BACKGROUND OF THE INVENTION

1. Field of the Invention

This invention relates to transmission space diversity, and more particularly to a transmission space diversity transmission method and a transmission space diversity apparatus suitable for use with a duplex communication system for different transmission and reception frequency signals.

2. Description of the Related Art

In a radio communication system, a diversity system is adopted in order to prevent deterioration in communication quality caused by an obstacle to radio wave propagation between transmitting and receiving stations.

Particularly, for a propagation path in which an obstacle to radio wave propagation is caused by the influence of shadowing caused by an obstacle to an antenna and multi-path fading caused by composite attenuation by a direct wave and a reflected wave or the like, a reception space diversity system is usually utilized as a countermeasure to the obstacle to radio wave propagation.

However, in a time division multiple access (TDMA) radio communication system wherein a plurality of terminal stations communicate with one base station like a mobile communication system, the reception space diversity system cannot sometimes be utilized from a demand for miniaturization or cost lowering of a terminal station apparatus. In such an instance, a transmission space diversity system is adopted wherein a plurality of antennas are provided on the transmission side and one of the antennas with which a terminal station can receive a radio wave with a comparatively high quality is selected to transmit a radio wave.

FIG. 1 shows a conventional example wherein such a transmission space diversity system as described above is applied to a TDMA communication system of mobile communication (Japanese Patent Laid-Open Application No. Heisei 5-29992).

The circuit shown in FIG. 1 includes two antennas 21 and 22 each for use during transmission and reception, receivers 23 and 24 corresponding to antennas 21 and 22, respectively, error detection circuits 29 and 30 for received signals, error bit comparison circuit 26, reception output selection switch 28, transmitter 25, and change-over switch 27 for switching the output of transmitter 25. The space diversity system adopts a system wherein a signal of a same carrier frequency is alternately transmitted and received in a predetermined period and the reception diversity and transmission diversity are operated at the base station side.

A mobile station performs control overhead and data to for the base station within a time slot to the base station, and the base station receives the overhead and the data through antennas 21 and 22 and the received information is provided to the corresponding receivers 23 and 24 and to the respective error detection circuits 29 and 30, and so forth. The base stations performs the reception space diversity control by comparing the reception bit error rate of the two reception signals through antenas 21 and 22 by the bit error comparison circuit 26 and outputs a received signal which exhibits a lower error rate through selection switch 28. Furthermore, whenever the base station transmits to the mobile station, transmission diversity control to utilize the antenna which received the lower error rate on the latest reception.

While the present system is characterized in that an antenna which is less influenced by a waveform distortion caused by frequency selective fading is selected, it is based on the presumption to employ a transmission-reception system that uses the same carrier frequency wherein the correlation between a signal from a terminal station and a signal from a base station is high and the reversibility of a transmission path is provided.

As described above, in the conventional transmission space diversity system, such control as described above is performed under the condition that the same carrier frequency is used for both reception and transmission. However, where an FDD (frequency division full duplex) communication system wherein different carrier frequencies are used for transmission and reception is adopted, or in a system wherein, while a TDD (time division duplex) communication system is adopted, carrier frequencies in transmission and reception may not necessarily be same as each other, since the manner in which multi-path fading occurs is different depending on the carrier frequencies, an effective effect of space diversity cannot be obtained by the controlling method described above.

This is described in connection with interference between a direct wave and a reflected wave when multi-path fading occurs with reference to FIG. 2. If it is assumed that the distance between a transmission point and a reception point is x=50 m, a reflection plate is located at a middle point, the angle with respect to the reflection plate is θ=20°, and the reflection coefficient of the reflecting plate is 1, the phase difference in wavelength at the reception point can be calculated from a difference in distance between the direct wave and the reflected waves dividing the distances by the wavelength. Accordingly, for example, where the transmission frequency is 20.10 GHz, the numbers of times wavelengths at the transmission and reception points are approximately 3,350.00 times wavelength with the direct wave and approximately 3,565.00 times wavelengths with the reflected wave and the difference between the wavelengths is approximately 215.00 times wavelengths. Consequently, it can be recognized that the direct wave and the reflected wave are composed substantially fully in the same phases with each other. On the other hand, where the transmission frequency is 19.96 GHz, the wavelengths at the transmission and reception points are approximately 3,326.67 times wavelengths with the direct wave and approximately 3,540.16 times wavelengths with the reflected wave, so the difference between of the distances divided by the wavelength is approximately 213.49 times wavelengths. Consequently, it can be recognized that the direct wave and the reflected wave are composed substantially fully in the inverse phases with each other. Consequently, it cannot be said that, even in fading arising from two waves, the phase of the direct wave and the reflected wave composed with a frequency difference of 140 MHz in the proximity of 20 GHz coincide with each other. Consequently, where different carrier frequencies are used for transmission and reception, improvement in communication quality against multi-path fading cannot be anticipated at all even if the space diversity system of the conventional example wherein a result of reception space diversity is used for transmission space diversity control is adopted. Therefore, where the carrier frequencies in transmission and reception are different from each other, the transmission space diversity system described above is not adopted.

SUMMARY OF THE INVENTION

It is a first object of the present invention to provide a transmission space diversity controlling method and a transmission space diversity apparatus wherein a good space diversity characteristic is assured even where different carrier frequencies are used for an up-link and down-link corresponding to a transmission and reception.

It is a second object of the present invention to provide a transmission space diversity method and a transmission space diversity apparatus for a TDMA radio communication system.

In order to attain the first object described above, according to the present invention, a transmission space diversity controlling method wherein a reception space diversity controlling signal is used for a transmission space diversity controlling signal for switching a plurality of antennas of transmission space diversity the method, comprising the steps of:

receiving detected reception quality information from the communication party station; and reviewing the received reception information and switching to the best antenna for transmission space diversity controlling.

Meanwhile, in order to attain the second object, a transmission space diversity controlling method is provided, wherein the above transmission diversity controlling is performed at a base station of a TDMA communication system in a mobile communication system, said base station having two antennas each for use for both transmission and reception and the communication party stations are a plurality of terminal stations.

Further, in order to attain the second object, according to the present invention, a transmission space diversity controlling method is provided in a TDMA communication system which includes a base station having two antennas each for use for both transmission and reception and a plurality of terminal stations, the method comprising the steps of: transmitting a control signal through an antenna to a terminal station from the base station;

discriminating the reception quality of the received control signal and transmitting the reception quality information to the base station at the terminal station when receiving the control signal; and at the base station, detecting the reception quality information transmitted from the terminal station;

controlling whether the reverse or non-reverse the transmission space diversity controlling signal at the base station according to the received reception quality information for each terminal station.

Furthermore in order to attain the second object, according to the present invention, a transmission space diversity apparatus for a mobile communication system of a TDMA communication system which includes a base station having two antennas each used for both transmission and reception and a plurality of terminal stations, is provided comprising:

reception quality discrimination means provided in each of the terminal stations for discriminating reception quality of a received control signal;

reception quality information transmission means provided in each of the terminal stations for transmitting the reception quality information with a transmission time slot of the terminal station destined for the base station;

reception space diversity controlling means provided in said base station for generating a reception space diversity controlling signal for each of the terminal stations;

transmission space diversity controlling means provided in the base station for switching the antennas against each of the terminal stations using the reception space diversity controlling signal as a transmission space diversity controlling signal;

reception quality information reception means provided in said base station for detecting and receiving the reception quality information transmitted from a terminal station through a transmission time slot assigned for the terminal station; and reversal control means provided in the base station for controlling whether the transmission space diversity controlling signal for each of the terminal stations is reversed or not based on the reception quality information of the corresponding terminal station.

DESCRIPTION OF THE PREFERRED EMBODIMENTS

Figure 1:
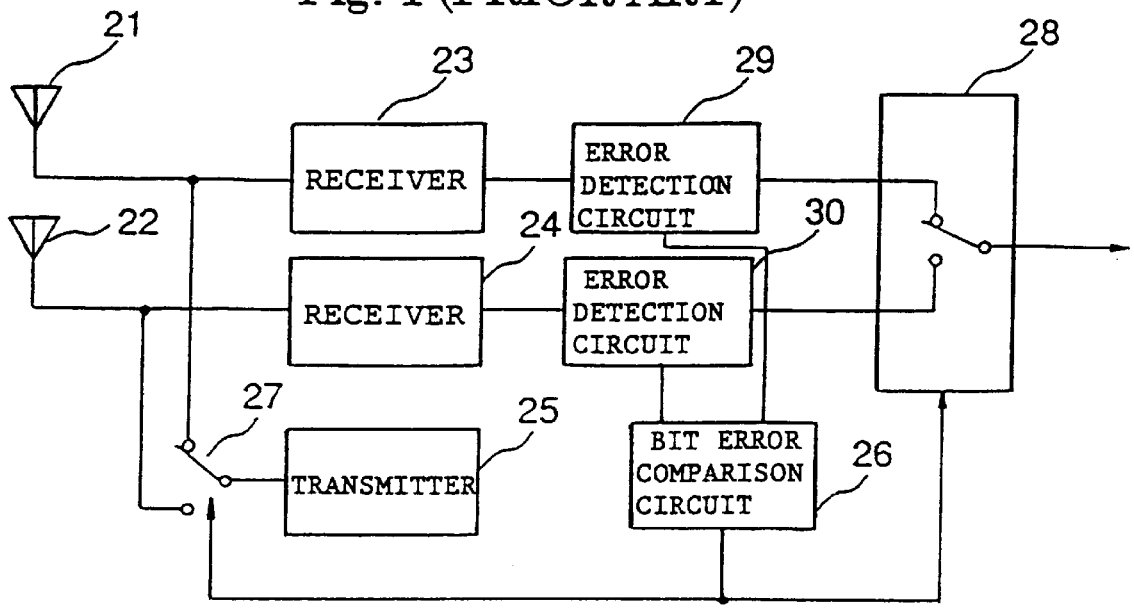
FIG. 1 is a block diagram of a conventional example of a transmission space diversity controlling apparatus.
Figure 2:
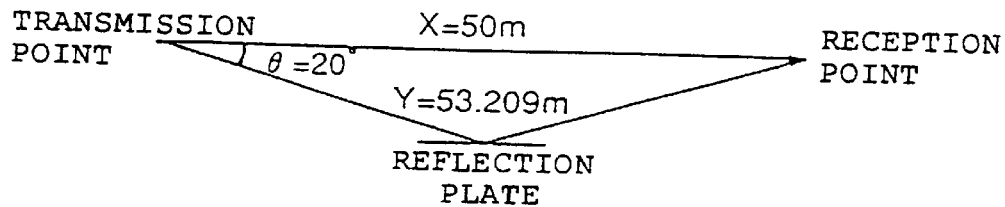
FIG. 2 is a diagram view illustrating multi-path fading.
Figure 3:
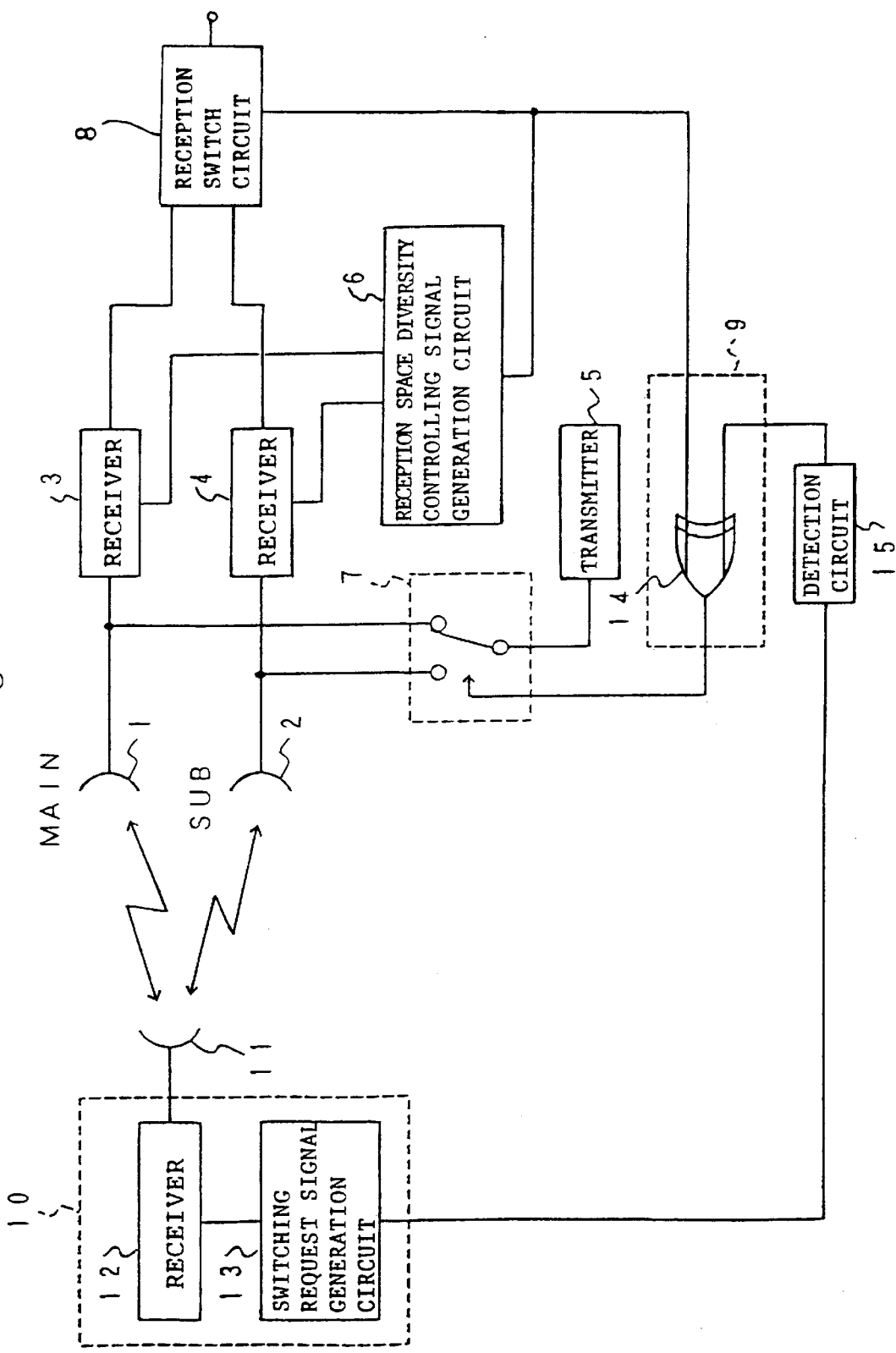
FIG. 3 is a block diagram of an embodiment of a transmission space diversity apparatus of the present invention.

Embodiments of the present invention are described in detail below. FIG. 3 is a block diagram showing an embodiment wherein the present invention is applied between a terminal station and a base station. Referring to FIG. 3, the base station employs a reception space diversity system and comprises two receivers 3 and 4 having antennas 1 and 2 each for use for both transmission and reception and receiving antenna outputs from antennas 1 and 2, respectively, reception space diversity controlling signal generation circuit 6 for detecting receiving conditions of the receivers and generating a reception space diversity control signal, and reception switch circuit 8 for selectively extracting the output of one of the receivers which exhibits the best receiving condition in response to the reception space diversity control signal, and comprises transmitter 5, transmission switch circuit 7 for selecting a transmitter output from two antennas, and transmission space diversity controlling signal reversal circuit 9 to which a switching request signal produced in response to the output of reception space diversity controlling signal generation circuit 6 and a switching requesting signal based on a terminal station reception quality information received from terminal station 10 side are inputted to output a switching control signal which is provided to switch 7. Meanwhile, terminal station 10 includes antenna 11 for transmitting and receiving radio waves to and from the base station, receiver 12 for receiving the output of the antenna, and switching request signal generation circuit 13 for detecting a receiving condition of receiver 12 and generating a switching request signal for the base station antennas.

Influences of multi-path fading on the case of distance x between the transmission and reception stations and angle θ of the reflection member direction are first described in connection with an antenna switching controlling operation of the transmission space diversity of the present embodiment.

Figure 4:
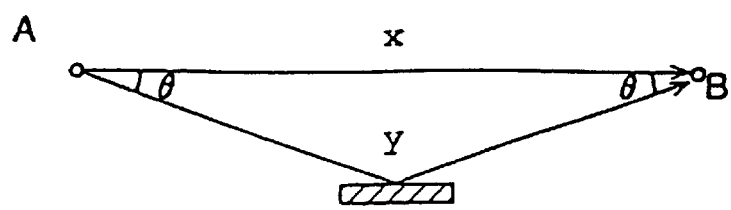
FIG. 4 is a diagram view illustrating multi-path fading.

Referring to FIG. 4 in which a manner of interference between a direct wave and a reflected wave upon occurrence of multi-path fading is shown in the form of a model, since distance difference y−x between distance x (distance of the direct wave) from an A point to a B point and distance y (distance of the reflected wave) where the wave is received via the reflection plate) is represented by $$y-x=x(1/\cos\theta-1)$$

reaching wavelength difference H to the B point where the wavelength i is given by $$H=x(1/\cos\theta-1)/i$$

Thus, where the frequency is F, reaching wavelength difference H mentioned above is given by $$H=x(1/\cos\theta-1)/(3\times10^8/F)$$

Then, calculating (decimal portion of H-0.5) in order to detect a phase difference between the two signals, the relationship between them is given as

[decimal portion of H-0.5]. . . -0.5-0-+5
[phase difference]. . . 0°-180°-0°

Thus, calculating an absolute value of the difference between absolute values of them (|decimal portion of H-0.5|): as the value decreases, deterioration by two-wave fading increases) for a case wherein distance x between the transmission and reception stations is varied within the range of 0 to 50 m and angle θ is varied within the range of 0 to 30 where frequency F of the down-link=20 GHz and frequency F' of the up-link =20.12 GHz, a difference between phase differences between a direct wave and a reflected wave between the up-link and the down-link is obtained. This difference corresponds to a difference between the up-link and down-link reception levels arising from an influence of fading, and curves shown in FIG. 5 are obtained by plotting the difference in the form of a graph.

Figure 5:
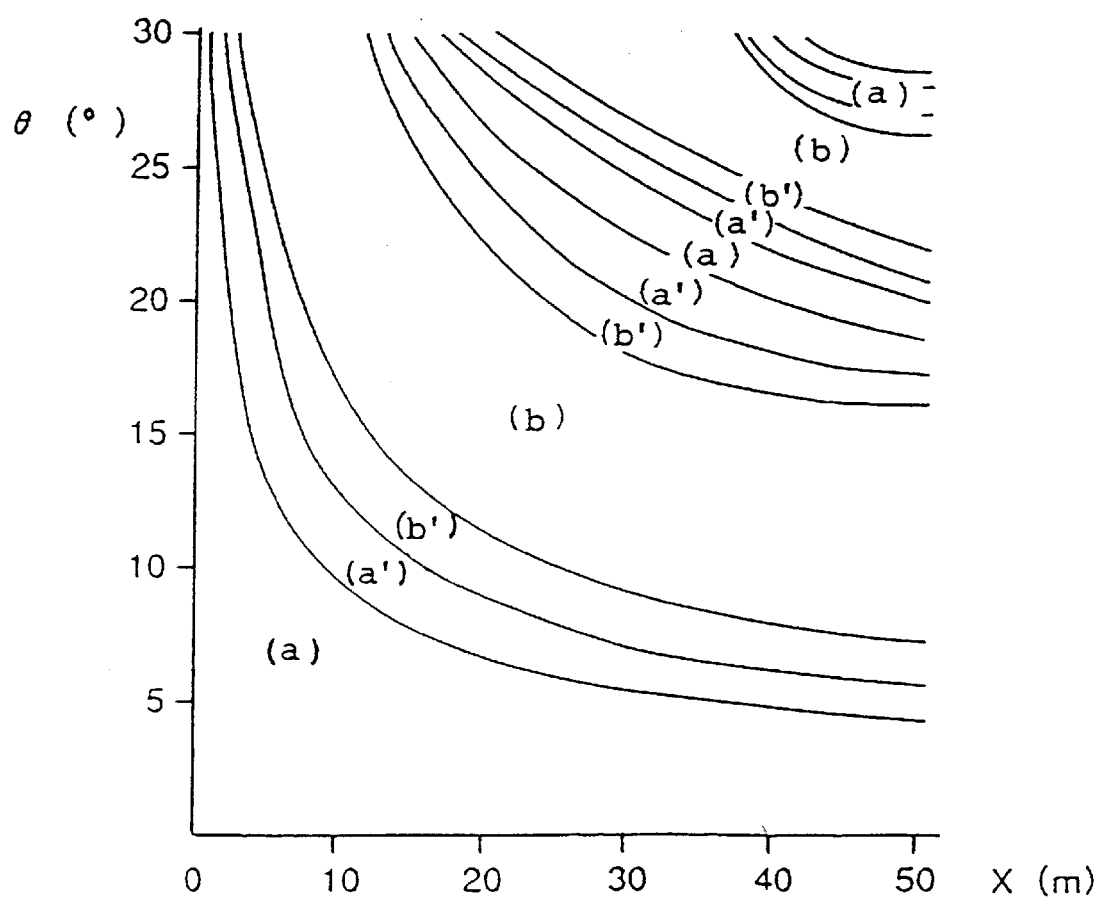
FIG. 5 is a diagram illustrating a correlation between transmission paths of a up-link (from terminal station) and a down-link (to terminal station)

In regions denoted by reference symbol (a) in FIG. 5, the absolute value of the difference between the absolute values=0, and the up-link and down-link propagation path characteristics have a correlation. On the other hand, in regions denoted by reference symbol (b), the absolute value of the difference between the absolute values=0.5, and the up-link and down-link propagation path characteristics have the opposite correlation. Meanwhile, in intermediate regions denoted by reference symbols (a') and (b') between those regions, the absolute value of the difference between the absolute values ranges from 0 to 0.5, and the up-link and down-link propagation path characteristics have an intermediate correlation. Here, if the transmission and reception frequencies are spaced by a greater amount, then the number of striped regions shown in FIG. 5 increases.

Referring to FIG. 5, as optimum selection of MAIN/SUB antennas 1 and 2 in the up-link of the frequency of 20.12 GHz, the possibility of better transmission is anticipated where, in each region denoted by reference symbol (a), the control of the transmission space diversity adopts the same as the control of the reception space diversity, but in each region denoted by reference symbol (b), the control of the transmission space diversity adopts an opposite control of the reception space diversity. Further, as can be seen from FIG. 5, even if the terminal station moves over a comparatively wide range a little, the controlling method need not be varied at a high speed.

Referring to the consideration described above, it can be recognized that, in the transmission space diversity control against multi-path fading, it is effective to hold on or switch the antenna which is selected by the reception space diversity control in response to the reception condition on the terminal station side.

Next, operation of the embodiment of the present invention of FIG. 3 is described.

Reception space diversity controlling signal generation circuit 6 of the base station detects field strengths of antennas 1 and 2 based on the reception levels of outputs from receivers 3 and 4 and generates a reception space diversity controlling signal for operating reception switch circuit 8 which switches the output of the receivers 3 and 4. Furthermore, transmission space diversity controlling signal reversal circuit 9 utilizes the reception space diversity controlling signal for a transmission space diversity controlling signal to operate selection control of the antenna so that transmission switch circuit 7 selectively switches the output of transmitter 5.

In the terminal station, switching request signal generation circuit 13 supervises the communication quality of receiver 12 and generates a reverse request signal when the reception condition exhibits some deterioration. The reverse request signal is sent out to the base station via a predetermined communication path or some other transmission path between the terminal station and the base station.

In the base station, when the reverse request signal is detected by detection circuit 15, transmission space diversity controlling signal reverse circuit 9 reverses the reception space diversity controlling signal to switch over switch 7 for selection of an antenna to the opposite direction. In particular, transmission space diversity controlling signal reversal circuit 9 executes a logical operation between the reception space diversity controlling signal and the reverse request signal in the form of a binary signal obtained by level discrimination of the reception level by means of exclusive OR circuit 14 and automatically executes the transmission space diversity control using the logic output of the logical operation as a controlling signal for transmission switch circuit 7.

As described above, the base station affects transmission and reception operations in the same or opposite phase to and from a terminal station in each region (a) or (b) of FIG. 5. On the other hand, while, in each region (a') or (b'), reversal of the transmission space diversity control may possibly occur repetitively in response to the reception level, even if such control is executed, an essentially particular problem does not occur.

Next, another embodiment of the present invention wherein the transmission space diversity system described above is applied to a TDMA (time division multiple access) radio communication system in which a plurality of terminal stations execute different time slots half duplex communication with one base station.

Figures 6A, 6B, 6C:
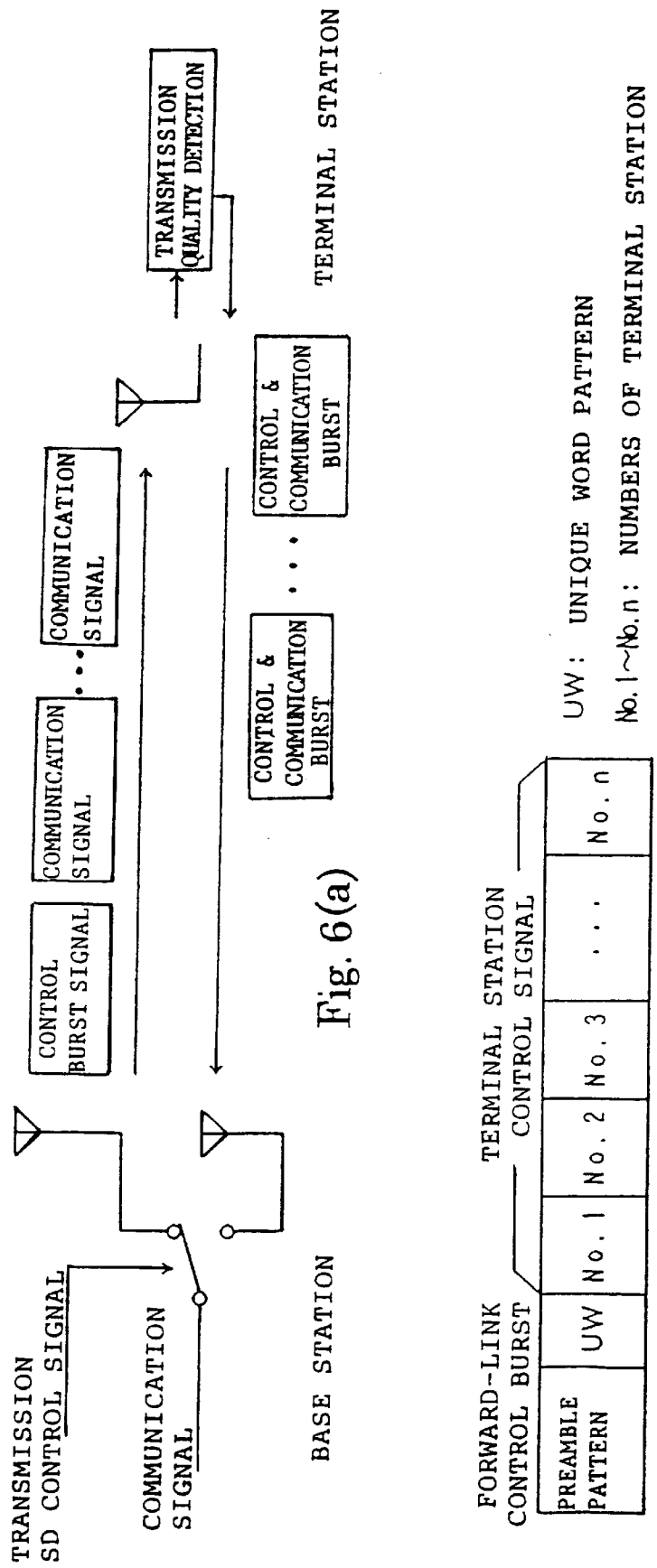
FIG. 6 shows an embodiment of the present invention where it is applied to a TDMA radio system, and wherein FIG. 6(*a*) is a diagram view illustrating a concept of up- and down-links between a base station and terminal station, FIG. 6(*b*) is a diagram view showing a frame of a control and communication burst of up-link and FIG. 6(*c*) is a diagram view showing a construction of a frame of a control and communication burst of down-link.

FIG. 6 shows a diagram view illustrating a concept of up- and down-links between a base station and a plurality of terminal stations in a TDMA radio communication system and diagram views showing signals of up-link and down-link control time slots.

The down-link from the base station toward the terminal station has a down-link control burst to be used for call control destined for all terminal stations and a communication burst for transmission of communication information destined for each terminal, respectively. Each burst in the up-link from a terminal station toward the base station includes an down-link control time slot for transmission of line quality information and a communication slot for transmission of communication information.

In a reception controlling operation of the base station, reception space diversity control is performed, wherein a signal transmitted from a terminal station is received on a burst unit and a reception level is detected from the received signal to select an optimum antenna. More particularly, for each burst, for example, the reception level of a carrier synchronization pattern of a preamble is detected alternately at both of the MAIN/SUB antennas and the detected reception levels are compared with each other to discriminate a higher one of the detection levels, and a reception space diversity controlling signal is generated based on the higher detection level. Then, the antenna with corresponding receiver are specified by the reception space diversity controlling signal and then intended reception of the burst is started. A similar reception controlling operation is performed for bursts from each terminal station.

In the controlling operation of each terminal station, a communication burst of the down-link is received and the reception level of the signal from the base station at the terminal station is detected to supervise the communication link quality. For example, when a terminal station detects a drop of the reception level, it inserts a request signal for reversal of the transmission space diversity controlling signal into a control response of a control time slot of a burst signal destined for the base station to notify the base station of the drop of the reception level.

In the base station, the state of the reversal request signal of the transmission space diversity controlling signal of a control time slot from each terminal station is supervised, and if a reversal request signal is detected, then the reception diversity controlling signal of a transmission time slot destined for the terminal station is reversed to effect switching control between the transmission antennas by means of the transmission switch circuit 7.

It is to be noted that, since, in a time division multiple access communication system, bursts of the base station upon transmission and reception are different in time from each other, in order to adjust the time difference for antenna switching of the transmission space diversity by a reception space diversity controlling signal, delay means or storage means for reception space diversity control signals corresponding to terminal stations are required.

While, in the embodiments described above, the present invention is described in connection with examples of application thereof to a 1:1 communication system and a TDMA communication system, the present invention can apparently be applied suitably to an FDD communication system. Furthermore, while, in the embodiments, it is described that reception space diversity control and switching request for a transmission space diversity controlling signal are performed based on a field strength such as a reception level of the other party station, they may be performed based otherwise on, in place of the field strength, an error rate of demodulation data, a synchronization or asynchronous state of the terminal station, or a reception level when the synchronism of the terminal station is lost or any combination of them.

Furthermore, while, in the embodiments described above, the transmission space diversity of the two antennas is described, the present invention can be applied to transmission space diversity by three or more antennas. For example, where a reception space diversity controlling signal based on a priority order in reception field strength is used for reception space diversity control, an algorithm by which the priority order of an antenna selected upon reception is changed to the lowest priority order in response to a switching request signal from the other party station can be applied.

Furthermore, while a suitable transmission space diversity effect can be obtained where the present invention is applied to a communication system for different transmission and reception frequencies, the present invention can naturally be applied to other communication systems which have a reversibility in transmission line characteristic and employ the same frequency for transmission and reception.

According to the present invention, since a reception space diversity controlling signal is used as a transmission space diversity controlling signal and is switched in response to reception quality information of the other party station and used for selection control between antennas, the quality of the transmission side line against multi-path fading can be increased to a level equal to the quality of the reception side line by the reception space diversity method. Naturally, also the transmission space diversity against shadowing apparently functions effectively with certainty based on the reception quality information.

Moreover, in the other station apparatus on the reception side of the transmission space diversity controlling signal, since the reception condition can be augmented only by sending reception quality information, structural apparatus such as a reception space diversity apparatus which employs a plurality of antennas and so forth can be minimized and simplified to the utmost. This is suitable for a TDMA communication system for mobile communication which employs a portable terminal apparatus for which miniaturization, simplicity, cost lowering and so forth are demanded.

Particularly in a portable terminal apparatus, since MAIN/SUB antennas cannot be placed to have enough distance to exhibit sufficient effect of a reception space diversity, the effect by communication space diversity with a base station which can be controlled by a terminal is more remarkable than the reception space diversity of the terminal station.

Furthermore, as can be understood from the detailed description with reference to FIG. 5, even if a terminal station moves slightly a comparatively wide range, the reception quality is not varied by multi-path fading. Since such minor change does not effect substantially for any other factor of multi-path fading generally, the switching control of the base station need not be switched at a high speed. Therefore, the diversity system of the present invention is advantageous in that a delay of the switching control of antennas and a delay of the transmission time of reception quality information of a terminal station to the base station does not make a special problem.

What is claimed is:

1. A transmission space diversity controlling method comprising:
  generating a transmission space diversity controlling signal by using a reception space diversity controlling signal for the transmission space diversity controlling signal;
  switching a plurality of antennas of transmission space diversity based on said transmission space diversity controlling signal; the method further comprising the steps of:
  receiving a detected reception quality information signal from a receiving communication party station; and transmission space diversity controlling by performing a logic operation on the received reception quality information signal and the transmission space diversity controlling signal to switch to a next order one of said plurality of antennas for transmission space diversity controlling; and transmitting a transmission signal using the next order antenna.

2. The transmission space diversity controlling method as claimed in claim 1, wherein the step of transmission space diversity controlling is performed at a base station of a TDMA communication system in a mobile communication system, said base station having two antennas each for use for both transmission and reception and a plurality of communication party stations.

3. The transmission space diversity controlling method as claimed in claim 1, wherein the logic operation comprises a logical exclusive OR operation.

4. A transmission space diversity controlling method in a TDMA communication system which includes a base station having two antennas each for use for both transmission and reception and a plurality of terminal stations, the method comprising the steps of:

using a reception space diversity controlling signal at the base station to select a best antenna for transmission from the base station;

transmitting a control signal through an antenna to a terminal station from said base station;

discriminating the reception quality of the received control signal at the terminal station and transmitting a reception quality information signal to said base station from the terminal station when receiving the control signal;

at said base station, detecting the reception quality information signal transmitted from the terminal station; and performing for each terminal station a logic operation on said reception space diversity controlling signal and said reception quality information signal from each terminal station to control whether to reverse or not reverse a transmission space diversity controlling signal at the base station to thereby select on of said two antennas for transmission to a respective terminal station.

5. The transmission space diversity controlling method as claimed in claim 3, wherein the logic operation comprises a logical exclusive OR operation.

6. A transmission space diversity controlling apparatus for a TDMA mobile communication system which includes a base station having two antennas each for use for both transmission and reception and a plurality of terminal stations, comprising:

reception quality discrimination means provided in each of said terminal stations for discriminating reception quality of a received control signal transmitted from the base station;

reception quality information transmission means provided in each of said terminal stations for transmitting a respective reception quality information signal in a transmission time slot of the terminal station destined for said base station;

reception space diversity controlling means provided in said base station for generating a reception space diversity controlling signal corresponding to each of the terminal stations;

transmission space diversity controlling means provided in said base station for switching said antennas for transmission to said terminal stations using the reception space diversity controlling signal as a transmission space diversity controlling signal;

reception quality information reception means provided in said base station for detecting and receiving the respective reception quality information signals transmitted from a terminal station in a transmission time slot assigned for the terminal station;

logic means in said base station having as inputs said reception space diversity controlling signal and for each terminal station a respective one of said reception quality information signals and performing a logic operation on said inputs for each terminal station;

reversal control means provided in said base station responsive to said logic means for controlling whether the transmission space diversity controlling signal for each of said terminal stations is reversed or not reversed thereby to select a next order one of said antennas for transmission to a respective terminal station.

7. The transmission space diversity controlling apparatus as claimed in claim 4, wherein the logic operation comprises a logical exclusive OR operation.

* * * * *